Figure 1:
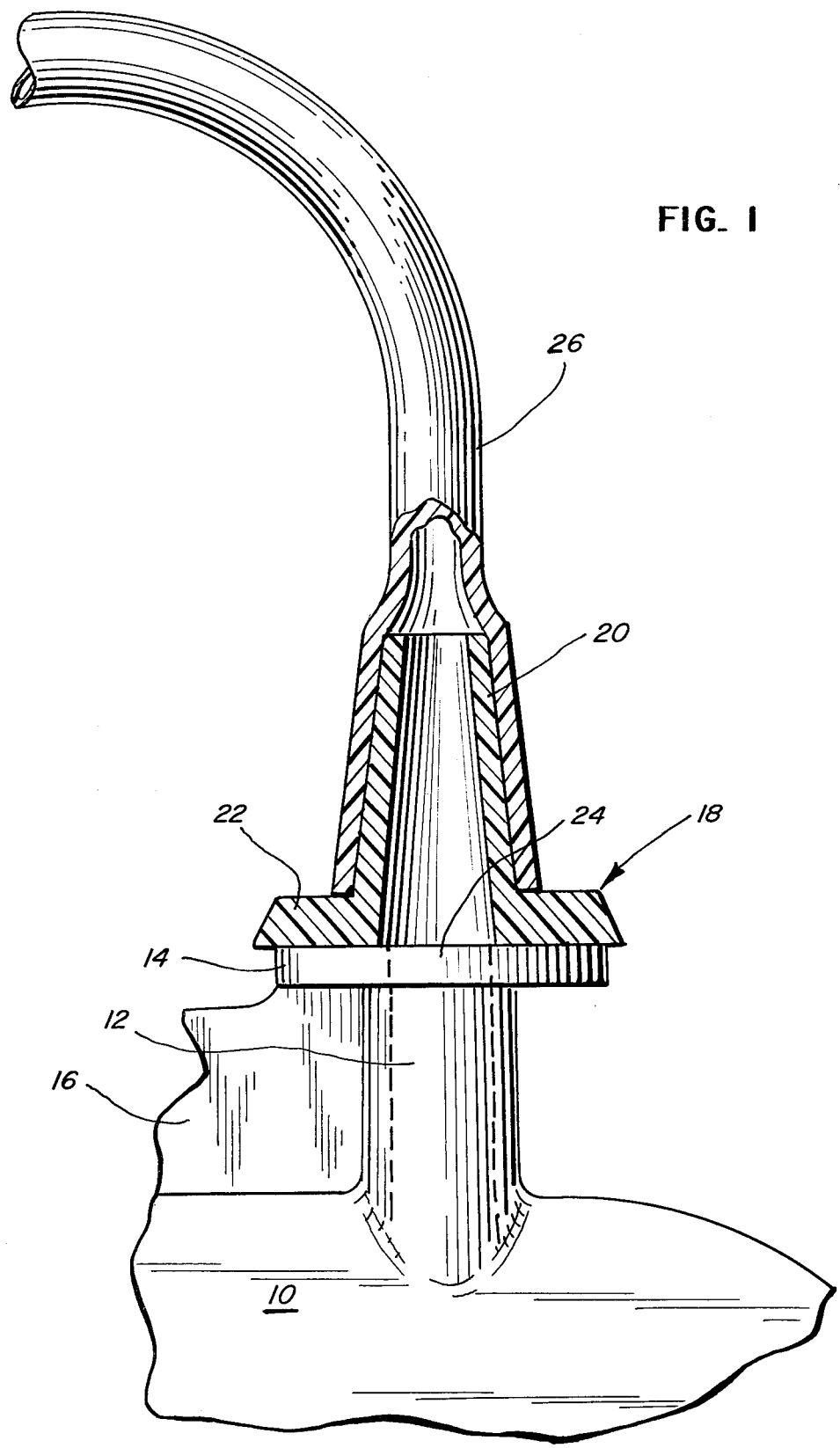

United States Patent [19]

Kwong et al.

[11] 4,327,726
[45] May 4, 1982

[54] CONNECTOR MEMBER FOR DISSIMILAR MATERIALS

[75] Inventors: Peter C. Kwong, Palatine; Dean G. Laurin, Lake Zurich, both of Ill.

[73] Assignee: Baxter Travenol Laboratories, Inc., Deerfield, Ill.

[21] Appl. No.: 67,068

[22] Filed: Aug. 15, 1979

[51] Int. Cl.³ .............................................. B32B 5/22
[52] U.S. Cl. ..................................... 128/272; 285/21; 285/423; 285/DIG. 20; 525/92; 150/8
[58] Field of Search ............... 128/272; 285/DIG. 20, 285/21, 423; 525/92; 150/8

[56] References Cited

U.S. PATENT DOCUMENTS

| | | | |
|---|---|---|---|
| 2,644,198 | 7/1953 | Crawford | 285/DIG. 20 X |
| 3,759,379 | 9/1973 | Wrede | 128/272 |
| 3,961,814 | 6/1976 | Bryne et al. | 285/21 |
| 3,963,026 | 6/1976 | Hert | 128/272 |
| 3,968,195 | 7/1976 | Bishop | 285/21 |
| 4,043,857 | 8/1977 | Bryne et al. | 285/DIG. 20 X |
| 4,090,996 | 5/1978 | Gergen et al. | 525/92 |
| 4,107,130 | 8/1978 | Gergen et al. | 525/92 |
| 4,110,411 | 8/1978 | Imanaka et al. | 260/873 |
| 4,112,020 | 9/1978 | Callan | 525/92 |
| 4,140,162 | 2/1979 | Gajewski et al. | 150/1 |
| 4,191,231 | 3/1980 | Winchell et al. | 150/8 |

FOREIGN PATENT DOCUMENTS 240015 4/1962 Australia ............................. 128/272

Primary Examiner—Robert W. Michell
Assistant Examiner—Nancy A. B. Swisher
Attorney, Agent, or Firm—Paul C. Flattery; John A. Caruso; Garrettson Ellis

[57] ABSTRACT

A plastic composition which may be molded into a connector which is capable of simultaneously sealing to both polyvinyl chloride plastics and polyolefin plastics. The plastic composition comprises from 50 to 75 percent by weight of an essentially polyolefin material which is sealingly compatible with the polyolefin plastic to which the composition is intended to be sealed, and from 25 to 50 percent by weight of a flexible block copolymer of covalently bonded polybutylene terephthalate units and poly(1,4-butylene) oxide units.

14 Claims, 1 Drawing Figure

U.S. Patent     May 4, 1982     4,327,726

CONNECTOR MEMBER FOR DISSIMILAR MATERIALS

BACKGROUND OF THE INVENTION

Many disposable medical devices such as blood bags, solution containers, administrative sets for blood or solution, and the like are made of a flexible, collapsible polyvinyl chloride plastic. Alternatively, polyolefin type and other materials have been proposed for use as a substitute for polyvinyl chloride plastic. See, for example, Gajewski, et al. U.S. Pat. No. 4,140,162, which discloses polyolefin-type blends for making flexible, collapsible containers.

It may be desirable in many instances to manufacture products, for example medical devices, in which some of the device is made of one type of plastic, for example a polyolefin, while another part of the device is made of a different type of plastic such as polyvinyl chloride. For example, it may be desirable for blood bag having a body made of a polyolefin material to be connected to a donor tube of a polyvinyl chloride formulation.

Unfortunately, polyvinyl chloride is sealingly incompatible with most polyolefin-type materials, so that the maintenance of a sealed, sterile connection between the donor tube and the body of such a blood bag is a substantial technical problem.

Attempts have been made to solve this by various mechanical seals, for example, see Vcelka and Winchell U.S. Pat. No. 4,049,034. However, these mechanical techniques for sealing incompatible materials all involve structure having increased complexity and expense over simpler seals, usable when the materials to be sealed are compatible.

In accordance with this invention, a plastic composition is disclosed which is capable of being formed into a connector member for simultaneously sealing to both polyvinyl chloride plastics and polyolefin plastics, eliminating the need for costly and complex mechanical expedients.

As a result of this, various devices, and specifically medical devices, may be fabricated with various parts made of dissimilar materials and connected together in accordance with this invention. Specifically, a polyolefin blood bag may carry a polyvinyl chloride donor tube, or alternatively a polyvinyl chloride blood bag may carry a polyolefin donor tube, or other parts which are made of polyolefin, with strong, hermetic seals depsite the general incompatibility of the two materials.

DESCRIPTION OF THE INVENTION

In accordance with this invention, a plastic composition is disclosed which may be formulated into connectors for various devices, and particularly medical devices such as blood or solution bags, or sets for delivery of blood or parenteral solution.

The plastic composition of this invention is capable of simultaneously sealing to both polyvinyl chloride plastics (for example by solvent sealing) plus polyolefin plastics (for example by ultrasonic or another type of heat sealing). The composition of this invention comprises (a) from 50 to 75 percent by weight of an essentially polyolefin material which is sealingly compatible with the polyolefin plastic to which said composition is intended to be sealed. Additionally, the composition of this invention contains (b) from 25 to 50 percent by weight of a flexible block copolymer of covalently-bonded polybutylene terephthalate units and poly(1,4-butylene) oxide units.

It is generally preferred to use in the composition of this invention as the essentially polyolefin material component the very formulation of polyolefin material to which the plastic composition of this invention is intended to be bonded. This may of course include polyethylene, polypropylene, or natural rubber latex, polybutadiene, polystyrene, or copolymers and blends of these materials with other vinylic polymers to form compounds such as ethylene propylene rubber, poly(ethylenevinyl acetate), acrylonitrile-butadiene-styrene plastic, and the like.

The term "polyolefin" as used herein is intended to denote materials which are polymerized by the basic vinylic polymerization reaction of ethylene or a substituted ethylene. It is contemplated that certain amounts of substituted ethylene materials may be present such as styrene, acrylonitrile, and the like, which cause the materials to be not true olefins. These are still contemplated to be within the scope of this invention as essentially polyolefin materials since their polymerization still approximates the vinylic polymerization reaction of ethylene, and related olefins such as propylene and butadiene.

Specifically, it is preferred for ingredient (a), the essentially polyolefin material of the plastic composition of this invention, to constitute from 10 to 40 percent by weight of a polyolefin consisting essentially of propylene units; from 40 to 85 percent by weight of a block copolymer having thermoplastic rubber characteristics, consisting essentially of a central block, preferably comprising 50 to 85 percent by weight of the copolymer molecule of a rubbery olefin polymer, and terminal blocks of polystyrene; and from 0 to 40 percent by weight of a softening agent selected from the group consisting of polyethylene, poly(ethylene-vinyl acetate) containing preferably no more than 35 percent by weight of vinyl acetate units, and poly(ethylene-propylene) preferably having no more than 60 percent by weight of propylene units.

Preferably, the above formulation is essentially free of liquid plasticizers, and the rubbery olefin polymer consists essentially of generally equal proportions of ethylene and butylene units. With such a formulation it is possible to provide clear, autoclavable, plasticizer-free plastic formulations, as described in U.S. Pat. No. 4,140,162 cited above.

Ingredient (b) of the plastic composition of this invention may be a flexable block copolymer of covalently bonded polybutylene terephthalate units and poly(1,4-butylene)oxide units. Preferably, the butylene oxide (polyether) blocks comprise from 50 to 70 percent by weight of the flexible block copolymer composition, for example, 60 percent. A type of the block copolymer is available from E. I. DuPont De Nemours & Co. under the tradename HYTREL. The specific material sold under the tradename HYTREL 5526 has been found useful in conjunction with the preferred composition of essentially polyolefin material. Preferably, the flexible block copolymer of ingredient (b) described above, may exhibit a melt flow rate of no less than 15 and typically 18 grams per 10 minutes at 220° C. as described in the test of ASTM D1238. Of course, the material of ingredient (b) should have sufficient molecular weight to be a solid thermoplastic material of satisfactory structural integrity.

The polyolefin material of ingredient (a) should also be a solid thermoplastic material of adequate physical properties so that the blend of the two materials will provide a connector member of appropriate physical properties. Frequently, the blended material is white, rather than being translucent or transparent, implying a certain amount of phase incompatibility. Nevertheless, highly satisfactory connector parts may be made from the material, and its tensile physical properties and softening temperature may be sufficient for autoclaving and other normal handling of disposable medical devices.

Preferably, from 60 to 70 percent of the essentially polyolefin material of ingredient (a) may be present with 30 to 40 percent of ingredient (b) being present. Pellets of the ingredients of the plastic composition of this invention may be simply mixed together in their proper ratio and poured into an injection molding machine. The molding screw takes care of the final mixing in the melted state, so that the formulation of the material can take place simultaneously with the molding process.;

Referring to the drawing,

FIG. 1 is a fragmentary, elevational view, taken partly in vertical section, of a blood bag of generally known design made of an essentially polyolefin blend, carrying the connector of this invention which, in turn, is connected to donor tubing made of a polyvinyl chloride formulation.

Referring to the drawing, blood bag 10 is shown, which may, for example, be similar in design to that shown in the pending patent application of David A. Winchell, et al. Ser. No. 817,940, filed July 22, 1977. Blood bag 10 may be made of a polyolefin blend with may include 20 parts by weight of polypropylene polymer having a melt flow of about 2, with a small amount of copolymerized ethylene (Rexene 23M2 sold by Dart Industries, Inc.); 60 parts by weight of the block copolymer, having thermoplastic rubber characteristics, consisting of a central block of poly(ethylene-butylene) and terminal blocks of polystyrene (KRATON G1662 sold by the Shell Chemical Company); and 20 parts by weight of a poly(ethylene-vinyl acetate) copolymer having about 28 percent of vinyl acetate units (Chemplex 3315, sold by the Chemplex Co. of Rolling Meadows, Ill.).

The blended material may be formulated to contain a trace amount of a conventional antioxidant.

Blood bag 10 as shown defines an access port 12 which, in turn, defines a terminal flange 14 which is integrally formed in relatively thick section along with the thinner sections of the flexible walls of blood bag 10. Web 16 as shown communicates between port 12 of blood bag 10 and an adjacent port (not shown).

In accordance with this invention, connector member 18 is disclosed, being preferably an injection-molded, single piece of the formula of this invention, comprising a tubular portion 20, and terminating in a flange 22. Connector member 18 may comprise 65 percent by weight of the essentially polyolefin material out of which blood bag 10 is made as described above, and 35 percent by weight of the block copolymer of covalently bonded polybutylene terephthalate, and poly(1,4-butylene)oxide units, and specifically a material sold as HYTREL 5526.

Flange 22 of connector 18 may be conventionally heat-sealed to flange 14 of the blood bag, using for example an ultrasonic sealing device or a spin welding device, so that a common bore 24 passes between connector 18 and port 12 of the blood bag.

Additionally, polyvinyl chloride donor tubing 26 may be solvent-sealed to the exterior of tubular portion 20 of connector 18, using, for example, cyclohexanone or any other volatile solvent for both of the materials as the adhesive means.

Surprisingly, both flange 14 and tubing 26 adhere very well to connector 18, with the result that great simplification of the bond between the dissimilar materials of those members may be obtained.

The above has been offered for illustrative purposes only, and is not intended to limit the invention of this application, which is as defined in the claims below.

That which is claimed is:

1. In a flexible, collapsible container comprising a container body which is made of a material selected from the group consisting of essentially polyolefin materials and polyvinyl chloride plastics, said container defining connected tubing which is made of a material selected from the group consisting of essentially polyolefin materials and polyvinyl chloride plastics, the tube material being of the other category of material from the material of the container body, and an apertured connector sealed to said container body and to said tubing to permit a fluid flow path to pass between the bore of said tubing and said container in aseptic manner, said connector being made of a plastic composition which comprises (a) from 50 to 75 percent by weight of an essentially polyolefin material which is sealingly compatible with the polyolefin material from which one of the container and tube is made, and (b) from 25 to 50 percent by weight of a flexible block copolymer of covalently bonded polyethylene terephthalate units and poly(1,4-butylene)oxide units.

2. The flexible, collapsible container of claim 1 in which said block copolymer of ingredient (b) is a thermoplastic material having a melt flow rate of no less than 15 grams per 10 minutes at 220° C. in accordance with ASTM D1238.

3. The flexible, collapsible container of claim 1 in which 60 to 70 percent of the essentially polyolefin material is present, and 30 to 40 percent of the block copolymer of ingredient (b) is present.

4. The flexible, collapsible container of claim 1 in which said block copolymer of ingredient (b) contains from 50 to 70 percent by weight of said poly(1,4-butylene oxide) blocks.

5. In a flexible, collapsible container comprising a container body which is made of a material selected from the group consisting of essentially polyolefin materials and polyvinyl chloride plastics, said container defining connected tubing which is made of a material selected from the group consisting of essentially polyolefin materials and polyvinyl chloride plastics, the tube material being of the other category of material from the material of the container body, and an apertured connector sealed to said container body and to said tubing to permit a fluid flow path to pass between the bore of said tubing and said container in aseptic manner, said connector being made of a plastic composition which comprises (a) from 50 to 75 percent by weight of an essentially polyolefin material which is sealingly compatible with the polyolefin material from which one of the container and tube is made, said essentially polyolefin material including from 40 to 85 percent by weight of a block copolymer having thermoplastic rubber characteristics consisting essentially of a central, rubbery olefin polymer block and terminal blocks of polystyrene, and (b) from 25 to 50 percent by weight of a flexible block copolymer of covalently bonded polyethylene-terephthalate units and poly(1,4-butylene)oxide units.

6. The flexible, collapsible container of claim 5 in which the rubbery olefin polymer of ingredient (a) is poly(ethylene-propylene).

7. The flexible, collapsible container of claim 5 in which said essentially polyolefin material of said connector also contains a polyolefin consisting essentially of propylene units.

8. The flexible, collapsible container of claim 5 in which said essentially polyolefin material of said connector also contains poly(ethylene-vinyl acetate) containing no more than 35 percent by weight of vinyl acetate units.

9. The flexible, collapsible container of claim 5 in which said block copolymer of ingredient (b) is a thermoplastic material having melt flow rate of no less than 15 grams per 10 minutes at 220° C. in accordance with ASTM D1238.

10. The flexible, collapsible container of claim 9 in which 60 to 70 percent of the essentially polyolefin material is present, and 30 to 40 percent of the block copolymer of ingredient (b) is present.

11. The flexible, collapsible container of claim 10 in which said block copolymer of ingredient (b) contains from 50 to 70 percent by weight of said poly(1,4-butylene oxide) blocks.

12. The flexible, collapsible container of claim 11 in which the rubbery olefin polymr of ingredient (a) is poly(ethylene-propylene).

13. The flexible, collapsible container of claim 5 in which the central block comprises 50 to 85 percent by weight of the block copolymer having thermoplastic, rubbery characteristics.

14. The flexible, collapsible container of claim 13 in which said container body is made of an essentially polyolefin material which contains a block copolymer having thermoplastic rubbery characteristics having a central block of poly(ethylene-butylene) and terminal blocks of polystyrene.

* * * * *